UNITED STATES PATENT OFFICE.

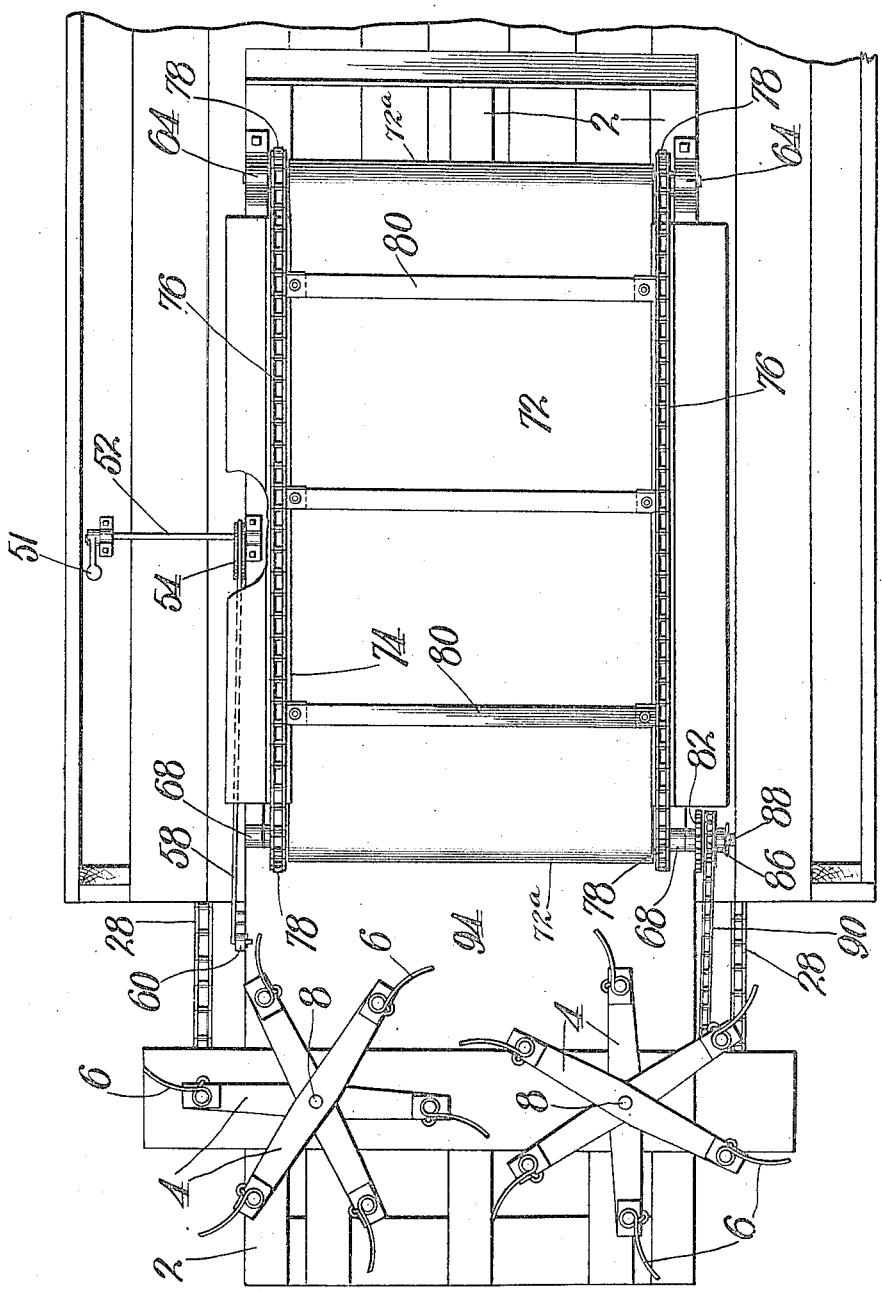

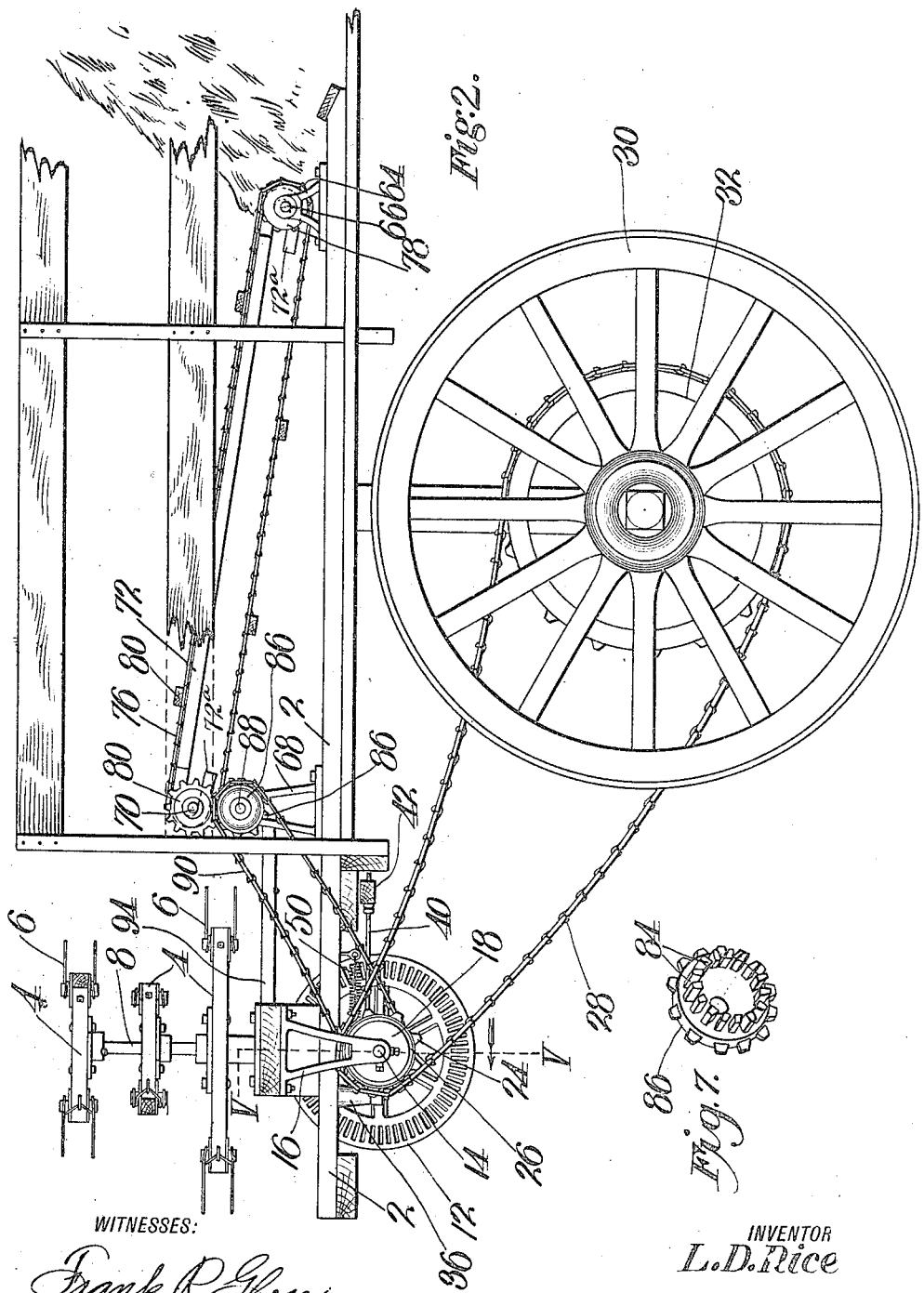

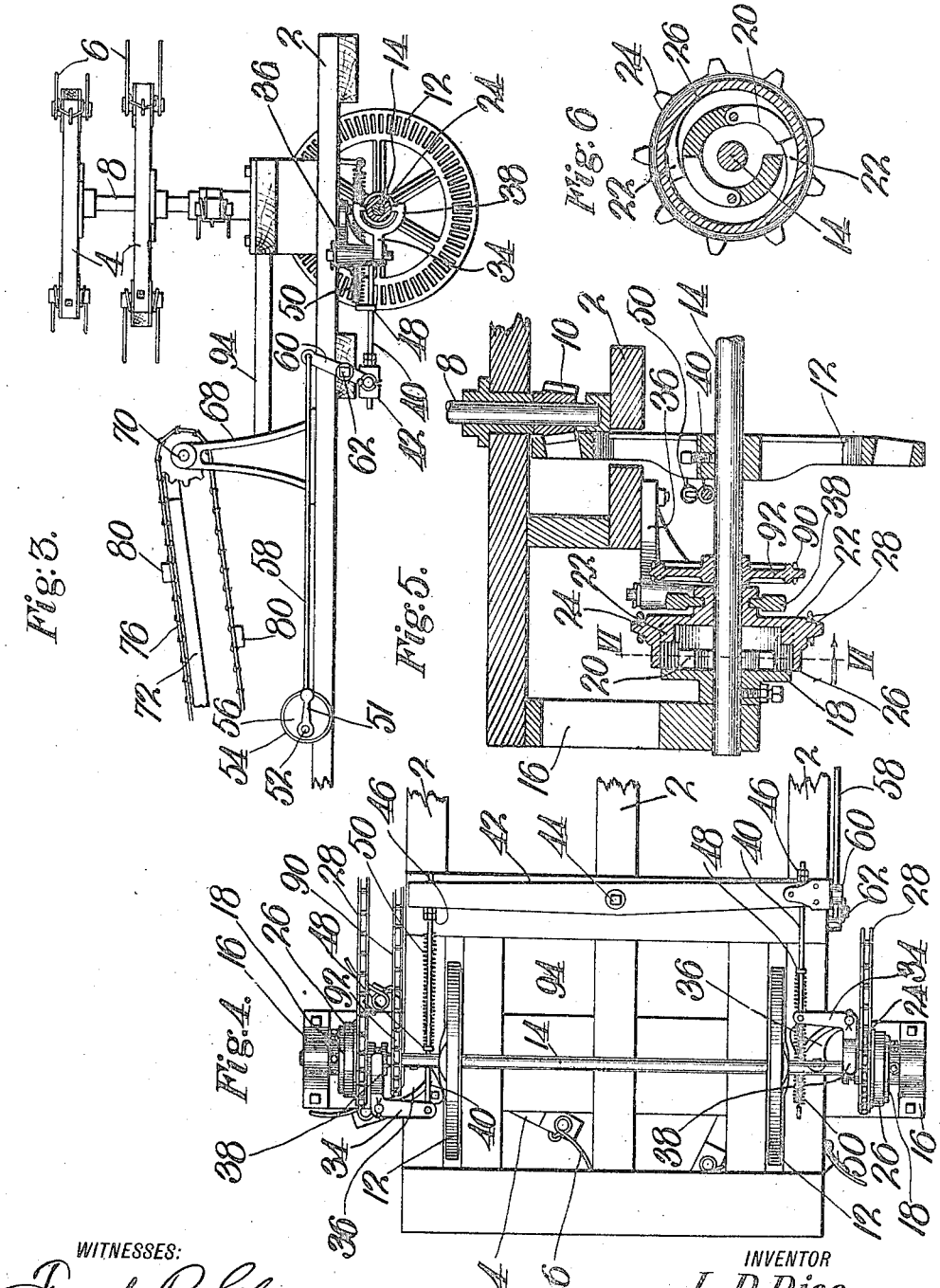

LEWIS D. RICE, OF KANSAS CITY, MISSOURI.

STRAW-SPREADER.

1,170,673.  Specification of Letters Patent.  Patented Feb. 8, 1916.

Application filed January 13, 1914. Serial No. 811,802.

*To all whom it may concern:*

Be it known that I, LEWIS D. RICE, a citizen of the United States, residing at Kansas City, in the county of Jackson and State of Missouri, have invented certain new and useful Improvements in Straw-Spreaders, of which the following is a specification.

This invention relates to straw spreading machinery and aims to provide an improved apparatus adapted to be applied to the ordinary farm wagon and having means for feeding the straw out of the wagon into the range of the straw spreader arms, together with means for driving both the feeding and spreading means from the wagon wheels.

One of the principal objects in view is to arrange this driving means for operation from both the rear wagon wheels when the latter are traveling at the same rate of speed, or from the faster of said wheels in case the rate of one exceeds that of the other, as when the vehicle is turning.

Another object is to provide the driving connections with means for conveniently throwing the same out of gear at the will of the person in charge of the straw spreading operation.

A further object is to provide a feeding means of a more positively actuated character.

With these objects in view the invention consists in certain novel and peculiar features of construction and organization as hereinafter described and claimed; and in order that it may be fully understood reference is to be had to the accompanying drawings, in which—

Figure 1, is a plan view of the rear end portion of a wagon with my improvements applied thereto. Fig. 2, is a side view of the same. Fig. 3, is a side view of the apparatus detached from the wagon and looking at the same in the opposite direction from Fig. 2, said view being partly broken away and in section and omitting the driving chains. Fig. 4, is an inverted plan view of the parts shown at the left in Fig. 1. Fig. 5, is a section on the line V—V of Fig. 2. Fig. 6, is a section on the line VI—VI of Fig. 5. Fig. 7, is a perspective detail of one of the driving elements of the straw feeding conveyer.

Referring to the drawings the main frame of the apparatus comprises longitudinal members 2 suitably connected and braced and projecting within the rear end of the wagon bed and secured thereto in any suitable manner, the outer or rear end of the main frame carrying the straw spreading means. This spreading means comprises a series of rotating arms 4 having the forks 6 and mounted on vertical shafts 8 suitably journaled in the main frame and provided with gears 10 at their lower ends. The gears 10 are driven by a pair of master wheels 12 secured upon a transverse counter shaft 14 which is journaled in hanger brackets 16 carried by the main frame. Adjacent each bracket 16 the shaft 14 also carries a clutch disk 18 on the inner face of which is pivoted a pair of clutch pawls 20 adapted to engage a pair of clutch shoulders 22 provided in connection with the adjacent sprocket wheel 24. The sprocket wheels 24 are journaled loosely on the shaft 14 and the outer face of each is formed with an annular flange 26 adapted to fit slidingly over the disk 18 when the parts are in clutched relation. Over each wheel 24 operates a chain 28 which is driven from one of the wagon wheels 30 by means of the sprocket drive wheel 32 secured rigidly to said wagon wheel in any suitable manner. For controlling the clutch members, bell crank levers 34 are journaled on brackets 36, one in front and the other at the rear of the shaft 14, and provided with yokes 38 engaging the grooved hubs of the sprocket wheels 24 (see Figs. 3 and 4). The opposite ends of said levers are connected to rods 40 which extend slidingly through the opposite ends of a lever 42 pivoted at its middle point to the main frame at 44, one of said rods being provided with nuts abutting against the rear edge of said lever 42, and the other rod having nuts 46 abutting against the front edge of said lever. Each rod 40 is also provided with a collar 48 to which is secured one end of a coil spring 50, the opposite end of which is secured to a point on the main frame, said springs extending in opposite directions from said collars and the arrangement being such that the springs tend normally to draw the rods in the direction to force the clutch members into engagement and thereby cause the shaft 14 and the straw spreader arms to be driven from the wagon wheels. With the clutch arrangement shown it will be observed that in case one of the wheels 30 travels faster than the other, as in turning of the wagon, the sprocket wheel 24 geared thereto will travel at the same rate of speed and correspondingly rotate the shaft 14, and that the other sprocket wheel 24 while being driven slower than the shaft 14, will not retard its rotation since the clutch disk 18 and its pawls 20 will merely rotate idly within the more slowly rotating sprocket wheel. Consequently, for the straight ahead movements of the wagon, during which the rear wheels rotate in unison, the straw spreading means will be driven effectively from both wheels, but for the turning movements of the wagon the spreader will always be driven from the wheel which is moving the faster.

In case the wagon is moving empty or at any other time when it may be desirable to cut out the spreader drive shaft 14, this may be done by means of the crank arm 51 located at a point convenient for manual operation. This arm is mounted on a short transverse shaft 52 suitably journaled at one side on the frame, to which shaft is secured an eccentric 54 operating a strap 56 and rod 58 connected to one end of a lever 60 pivoted to the machine frame at 62. The other end of lever 60 is pivoted to one end of the lever 42, the connections being so arranged that operation of the crank arm 51 will throw the lever 42 in the direction to move the rod 40 against the action of springs 50 by engagement with the nuts 46, and thereby disengage the clutch members in an obvious manner.

The conveyer for feeding straw from the wagon to the spreader and the driving connection for said conveyer comprises the following parts: Near the rear end of the main frame is supported a pair of bearing standards 64 for journaling a shaft 66, and on the frame adjacent the rear end of the wagon bed is supported a pair of similar but higher standards 68 for journaling a shaft 70, thus providing bearings on which the conveyer can be supported in an upward and rearward inclined direction toward the straw spreader. Extending between the shafts 66 and 70, and from side to side of the main frame is a platform 72 having downward curved end portions or hooks 72ª, which fit around the shafts 66 and 70 to utilize the same in holding the platform against displacement, and as will be readily understood by reference to Figs. 1 and 2. Adjacent to the sides of the platform are secured wear strips 74 forming tracks over which operates a pair of conveyer chains 76 carried around sprocket wheels 78 on the opposite ends of the shafts 66 and 70. These chains are connected by a series of conveyer slats 80 which gather the straw at the front end of the conveyer and draw it over the platform to the rear end of the conveyer where it is engaged by the spreader forks.

One end of the shaft 70 carries a gear wheel 82, which meshes with teeth 84 projecting laterally from one face of the sprocket wheel 86 (see Fig. 7) journaled on the stub shaft 88 carried by one of the standards 68. The wheel 86 is driven by means of sprocket chain 90 from a sprocket wheel 92 carried by the shaft 14. This type of conveyer is much more positive in its feeding action than the apron type of conveyer driven frictionally around rollers and the construction of the driving wheel 86 with the laterally projecting teeth affords a driving connection in which is eliminated to a large degree the liability of being clogged by the straw.

An auxiliary platform 94 is supported in the space directly to the rear of the standards 68 beneath the rear end of the conveyer and the lower set of spreader arms, so that the straw will be maintained in the field of action of the spreader arms and none of it carried back by the lower run of the conveyer.

From the foregoing it will be apparent that I have produced a straw spreader embodying the features of advantage enumerated as desirable and I wish it to be understood that while I have shown and described one form which my invention is designed to take, I reserve the right to make all changes falling within the spirit and scope of the appended claims.

I claim:

1. In a straw spreader, the combination of a vehicle, a frame carried thereby, a rotary shaft suitably journaled on and extending transversely of said frame, vertical spreader-fork-carrying shafts suitably journaled and geared to said transverse shaft, driven sprocket wheels journaled on the transverse shaft, clutch mechanisms for locking said sprocket wheels upon the shaft or releasing them from the latter, reversed bell cranks connected for effecting engagement or disengagement between said clutch mechanism, a rock lever pivoted to the said frame, rods pivotally connected to the bell-cranks and extending slidingly through opposite ends of said rock lever, abutments mounted upon said rods at opposite edges of the lever so that movement thereof in one direction shall rock the bell-cranks and disengage the clutch mechanisms, and in the reverse direction shall not affect either bell crank, and springs connecting said rods with the frame and tending to hold the clutch mechanisms in engagement with the adjacent sprocket wheels.

2. In a straw spreader, the combination of a vehicle, a frame carried thereby, a rotary shaft suitably journaled on and extending transversely of said frame, vertical spreader-fork-carrying shafts suitably journaled and geared to said transverse shaft, driven sprocket wheels journaled on the transverse shaft, clutch mechanisms for locking said sprocket wheels upon the shaft or releasing them from the latter, reversed bell cranks connected for effecting engagement or disengagement between said clutch mechanism, a rock lever pivoted to the said frame, rods pivotally connected to the bell-cranks and extending slidingly through opposite ends of said bell-cranks, abutments mounted upon said rods at opposite edges of the lever so that movement thereof in one direction shall rock the bell-cranks and disengage the clutch mechanisms, and in the reverse direction shall not affect either bell-crank, and springs connecting said rods with the frame and tending to hold the clutch mechanisms in engagement with the adjacent sprocket wheels, a lever operatively connected to said rock lever, a shaft suitably journaled, an eccentric thereon, and an eccentric strap and rod connecting the eccentric with the second lever.

In testimony whereof, I affix my signature, in the presence of two witnesses.

LEWIS D. RICE.

Witnesses:
H. C. RODGERS,
G. Y. THORPE.

Copies of this patent may be obtained for five cents each, by addressing the "Commissioner of Patents, Washington, D. C."